INVENTORS
ARNO ACHTERBERG
HELMUT GÖRMAR
KARL-HEINZ KLEEFISCH

ATTORNEYS.

INVENTORS
ARNO ACHTERBERG
HELMUT GÖRMAR
KARL-HEINZ KLEEFISCH
BY
ATTORNEYS.

United States Patent Office 3,344,473
Patented Oct. 3, 1967

3,344,473
SHEET EXTRUSION DIES FOR THE EXTRUSION OF THERMOPLASTICS
Arno Achterberg, Troisdorf-Oberlar, Helmut Gormar, Hennef, and Karl-Heinz Kleefisch, Bonn, Germany, assignors to Dynamit Nobel Aktiengesellschaft, Troisdorf, Bezirk Cologne, Germany, a corporation of Germany
Continuation of application Ser. No. 327,790, Dec. 3, 1963. This application July 14, 1966, Ser. No. 572,165
Claims priority, application Germany, Dec. 4, 1962, D 40,433
5 Claims. (Cl. 18—12)

This application is a continuation of application Ser. No. 327,790, filed Dec. 3, 1963, now abandoned.

When thermoplastic materials, such as polyvinyl chloride containing no plasticizer, are extruded into sheet material by means of worm extrusion machines using broad slot dies, variations in the product may occur shortly after the equipment is started up, often after only 2 to 3 hours of operation. Thus burnt spots or streaks appear in the sheet.

In sheet extrusion dies of the prior art, the passage for entry of the plastic to the broad slot discharge opening is in the center, and it opens into a passage transverse to it and in which the material is to be uniformly distributed over the breadth of the slot. The thermal decomposition phenomena occur mainly in the area of the intersection. The cross-section measured perpendicularly to the streamlines at the intersections is considerably larger than the cross-section of the inlet passage or of the passages downstream of the intersection. In other words, the average velocity of flow is considerably lower in the area of the intersection than the average velocity of flow of the material ahead of or behind the intersection of the passages. It has been found that this favors the thermal decomposition of polyvinyl chloride, for example, resulting in the separation of hydrochloric acid and a brown to black discoloration.

By the "average velocity" of flow $v$, is meant the quantity $q$ which passes through the cross-section $f$ per unit of time; in other words: $v=q/f$.

The subject of the invention is sheet extrusion dies for worm extrusion machines for handling thermoplastics, whose cross-section in the area of the passage intersection is so formed that the average velocity of flow of the material is practically no lower than its it ahead of or behind the intersection of the passage.

Thus, the invention provides an extrusion press having a discharge nozzle with a slot discharge opening, an inlet for delivery of material to the slot discharge opening disposed intermediate the ends of the slot discharge opening, means defining a passageway on each side of the inlet and extending along the slot discharge opening to one end portion thereof for receiving material from the inlet and distributing the material over the width of the slot, and means defining a junction communicating said inlet with each of said passageways. The flow axis of the inlet extends perpendicular, and is commonly disposed perpendicular to the said passageways. According to the invention the cross-sectional flow area at said junction is not substantially more than the cross-sectional flow area of either the inlet or the combined areas of the passageways. Normally there is an enlargement in cross-sectional flow area at the junction of the inlet and the passageway. To provide the desired reduction in cross-sectional flow area where the inlet is a conduit of uniform cross-section and the passageway is a conduit of uniform cross-section, the said conduits, at the junction, can be provided with an insert which reduces the cross-sectional flow-area. Also, the inlet conduit and the passageway conduit can have restrictions at the junction appropriate to reduce the cross-sectional flow area therein.

The invention is further described with reference to the drawings, wherein.

In the various views, like reference characters refer to corresponding parts.

Figure 1:
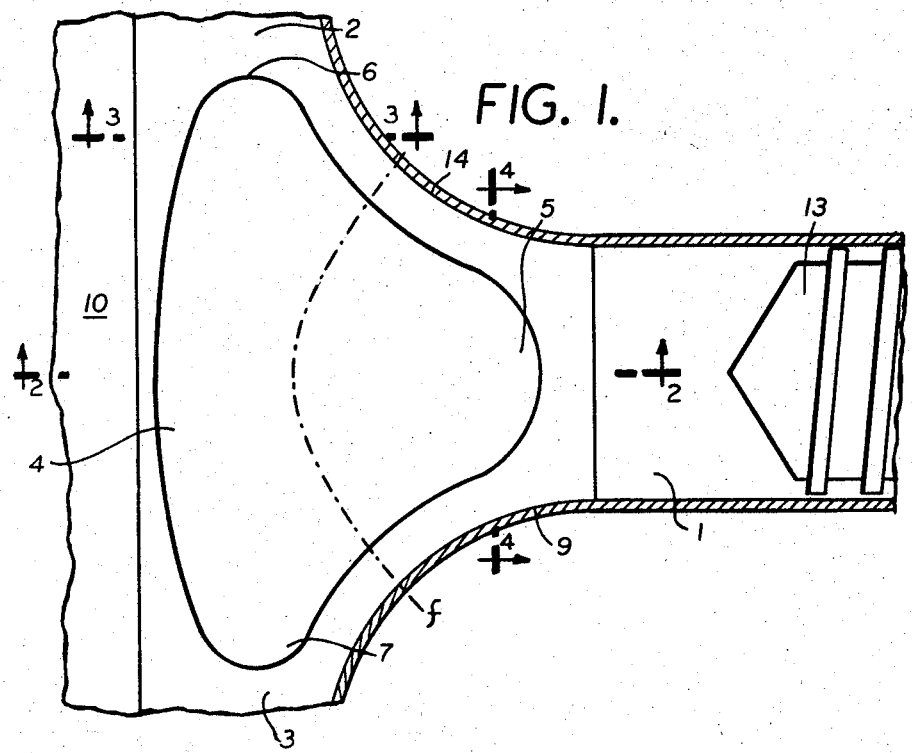
FIG. 1 is a plan view taken along line 1—1 in FIG. 2 of a portion of an extrusion press according to the invention, wherein the inlet is disposed perpendicular to the slot discharge opening, and wherein the junction of the inlet and said passageways is intermediate the outer ends of the passageways.
Figure 2:
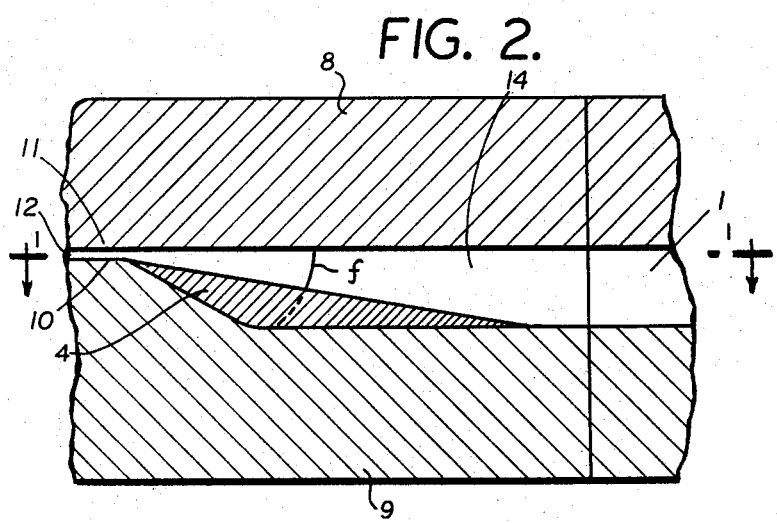
FIG. 2 is a view taken along line 2—2 in FIG. 1.
Figure 3:
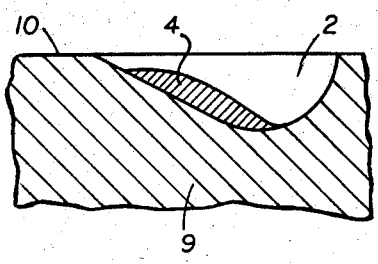
FIG. 3 and FIG. 4 are, respectively, cross-sectional views taken along lines 3—3 and 4—4 in FIG. 1.
Figure 4:
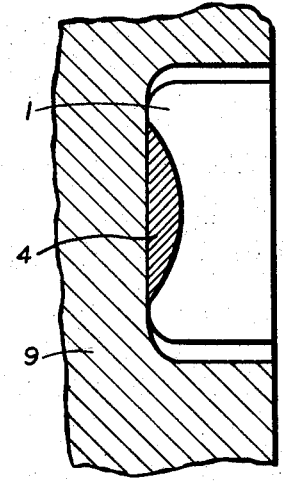
Figure 5:
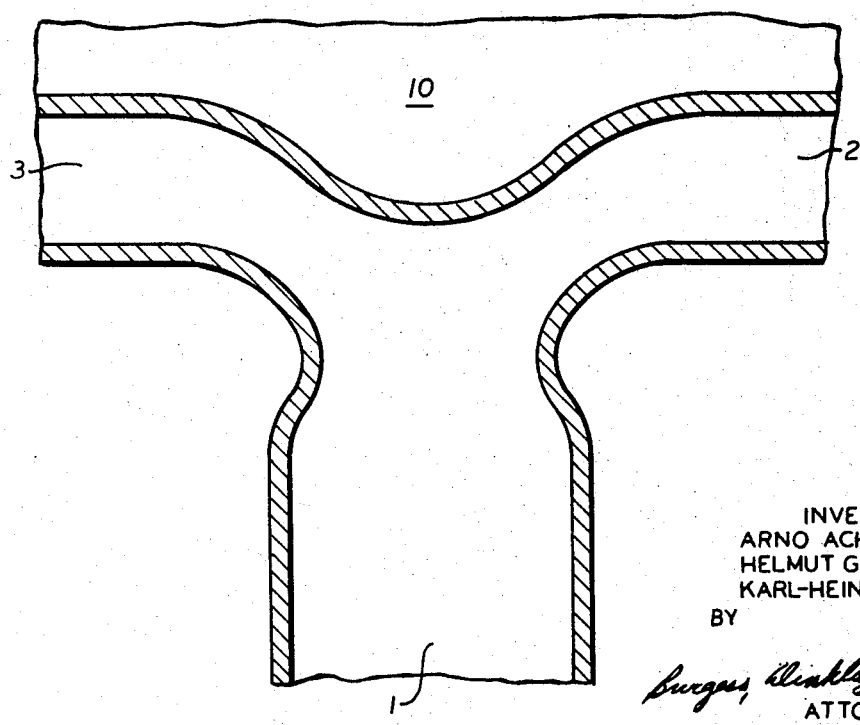
FIG. 5 is a view corresponding to the view shown in FIG. 1, but showing a modified construction for a discharge nozzle according to the invention.

Referring to FIGS. 1–4, FIG. 1 is a plan view of the lower part 9 shown in FIG. 2. The surfaces 10, 11 (FIG. 2) define the slot discharge opening 12. The inlet 1 receives material from the press which includes the screw 13, and a junction 14 divides the material into two streams one of which is directed by the junction into passageway 2, the other into passageway 3. The passageways 2, 3 extend outwardly to termination adjacent the end portions (not shown) of the slot discharge opening and serve to convey materal over the width of the slot discharge opening. FIG. 3 and FIG. 4 show cross-sectional views of the portion of the press shown in FIG. 1 possible according to the invention to provide for example, an insert or wedge-shaped part 4 with rounded corners 5, 6 and 7 in the area of the T-junction formed by intersections of the inlet 1 and the passageways 2 and 3. The die, however, can also be shaped, as is shown in FIG. 5, so that its passages 1, 2 and 3 are restricted in the manner of the bottleneck in the area of the junction or intersection. Thus the junction can be contoured to provide the desired effect. These sheet extrusion dies prevent the defects described above.

The broken line indicates a flow cross-section $f$ which is represented perpendicularly to the flow streamlines. The embodiment of the die shown in FIG. 1 has proven especially advantageous. The edges and projections of the wedge, which widens and slants upward going from the inlet passage 1 toward the outlet orifice, are rounded for streamlining purposes. The three rounded projections 5, 6 and 7 of the wedge-shaped part 4 extend, respectively, into the inlet passage 1 and into the horizontal passages 2 and 3. By means of this wedge-shaped piece, preferably made of metal, it can be brought about that the flow cross-section in the area of the passage intersection is practically no larger than the one ahead of or behind that area.

The preformed part 4 can be inserted into the extrusion die and fastened there. The die can, of course, also be made in one piece with the raised portion 4. The wedge-shaped part 4 can also be arranged both on the bottom part and on the top part of the die.

When the die of the invention is used, thermal decomposition phenomena do not occur, even after long periods of machine operation. The sheet extrusion die is free of burnt incrustations behind the opening in the middle portion.

While the invention has been described in reference to particular embodiments thereof, various alterations and modifications will occur to those skilled in the art. The embodiments disclosed are merely representative.

The following example may serve as a further explanation of the invention:

The die covered by the invention is for the working of a PVC-formula, without plasticizer, on the base of a suspension-PVC with a tin compound or a barium-cadmium compound as stabilizer. The cross-section area of the inlet e.g. is 16 cm.$^2$, the cross-section area in the branching range 13 cm.$^2$, behind the branching 7 cm.$^2$ each on both sides. The average speed is 1.4 m./min., 1.7 m./min. and 1.6 m./min., accordingly.

The die covered by this invention is particularly intended for the extruding of the following groups of plastics which are to be considered as thermally unstable thermoplasts:

Polyvinyl chloride and polyvinylidene chloride and their copolymers,
Acetal resin,
Polypropylene, and
Polytrifluorochloroethylene Every other extrudable plastic can, of course, also be extruded with the die covered by the invention.

What is claimed is:

1. In an extrusion device having a slot discharge opening; an extrusion press disposed intermediate the ends of said slot discharge opening and spaced apart therefrom; and conduit means disposed between said discharge opening and said press which joins said press at an inlet; wherein said conduit means extends outwardly from said inlet to the ends of said discharge opening and is adapted to distribute material from said press over the width of said discharge opening; the improvement which comprises providing said conduit means having a cross-sectional area, measured perpendicular to a flow axis therein, of up to the cross-sectional area of said inlet.

2. The improved press claimed in claim 1 wherein said conduit is substantially T-shaped.

3. The improved press claimed in claim 1 wherein said inlet means is disposed substantially midway between the ends of said slot discharge means.

4. The improved extrusion device as claimed in claim 1, wherein said conduit comprises a duct having an insert therein, whereby the cross-sectional flow area thereof is reduced as compared to the cross-sectional area of said inlet.

5. The improved press claimed in claim 4 wherein said insert is substantially T-shaped.

References Cited
UNITED STATES PATENTS

| | | | |
|---|---|---|---|
| 2,387,718 | 10/1945 | Coleman | 18—12 |
| 2,514,211 | 7/1950 | Carlson | 18—12 |
| 2,628,386 | 2/1953 | Tornberg | 18—12 |
| 2,734,224 | 2/1956 | Winstead | 18—12 |
| 3,000,054 | 9/1961 | Siefried et al. | 18—12 |
| 3,057,010 | 10/1962 | Reinfenhauser | 18—12 |
| 3,072,962 | 1/1963 | McDermott et al. | 18—12 |
| 3,197,815 | 8/1965 | Van Ripper | 18—12 |
| 3,212,134 | 10/1965 | Yokana | 18—12 |

WM. J. STEPHENSON, *Primary Examiner.*